(12) United States Patent
Takao

(10) Patent No.: US 11,262,732 B2
(45) Date of Patent: Mar. 1, 2022

(54) PLANT MONITORING SYSTEM, PLANT OPERATION ASSISTANCE SYSTEM, PLANT MONITORING METHOD, AND PROGRAM

(71) Applicant: MITSUBISHI HEAVY INDUSTRIES, LTD., Tokyo (JP)

(72) Inventor: Kenji Takao, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 396 days.

(21) Appl. No.: 16/494,456

(22) PCT Filed: Mar. 29, 2018

(86) PCT No.: PCT/JP2018/013226
§ 371 (c)(1),
(2) Date: Sep. 16, 2019

(87) PCT Pub. No.: WO2018/181705
PCT Pub. Date: Oct. 4, 2018

(65) Prior Publication Data
US 2020/0192335 A1 Jun. 18, 2020

(30) Foreign Application Priority Data
Mar. 31, 2017 (JP) .............................. JP2017-071157

(51) Int. Cl.
*G05B 19/41* (2006.01)
*G05B 19/418* (2006.01)
(Continued)

(52) U.S. Cl.
CPC ........ *G05B 19/4183* (2013.01); *H04L 9/0643* (2013.01); *H04L 9/0819* (2013.01); *H04L 2209/38* (2013.01)

(58) Field of Classification Search
CPC ....... H04L 9/0643; H04L 9/38; H04L 9/0819; G05B 19/4183
See application file for complete search history.

(56) References Cited

U.S. PATENT DOCUMENTS 6,038,486 A 3/2000 Saitoh et al.
2002/0188658 A1* 12/2002 Ohashi ................... H04L 67/12
709/201

(Continued)

FOREIGN PATENT DOCUMENTS

EP 2 728 175 5/2014
JP 10-098778 4/1998

(Continued)

OTHER PUBLICATIONS

International Search Report dated Jun. 26, 2018 in International (PCT) Application No. PCT/JP2018/013226 with English translation.

(Continued)

*Primary Examiner* — Tuan C Dao
(74) *Attorney, Agent, or Firm* — Wenderoth, Lind & Ponack, L.L.P.

(57) ABSTRACT

A plant monitoring system includes a plurality of distributed recording units in which programs for transmitting at least a portion of a group of a pieces of state monitoring information of the plant to a predetermined information processing device are previously recorded in a plurality of storage devices in a distributed manner, a determination unit that sequentially acquires the pieces of state monitoring information and determines whether or not the acquired pieces of state monitoring information satisfy a program execution condition prescribed in advance, and an execution request output unit that outputs a program execution request corresponding to the program execution condition to the distributed recording units in a case where the program execution (Continued)

condition is satisfied. Each of the distributed recording units includes a program execution processing unit that reads and executes the program designated by the execution request in a case where the execution request is output.

11 Claims, 11 Drawing Sheets

(51) Int. Cl.
*H04L 9/06* (2006.01)
*H04L 9/08* (2006.01)

(56) References Cited

U.S. PATENT DOCUMENTS

| | | | |
|---|---|---|---|
| 2003/0037113 A1* | 2/2003 | Petrovykh | H04L 67/04 709/205 |
| 2003/0135404 A1* | 7/2003 | Cheng | G06Q 10/0631 705/300 |
| 2006/0265709 A1* | 11/2006 | Meaney | G06F 8/63 717/178 |
| 2009/0043622 A1* | 2/2009 | Finlayson | G06Q 10/06 705/7.22 |
| 2009/0106836 A1 | 4/2009 | Toshima et al. | |
| 2013/0262916 A1 | 10/2013 | Sato | |
| 2018/0182048 A1 | 6/2018 | Stöcker et al. | |

FOREIGN PATENT DOCUMENTS

| | | |
|---|---|---|
| JP | 10-161707 | 6/1998 |
| JP | 11-231932 | 8/1999 |
| JP | 2002-202811 | 7/2002 |
| JP | 2003-337853 | 11/2003 |
| JP | 2004-021658 | 1/2004 |
| JP | 2007-241513 | 9/2007 |
| JP | 2008-176403 | 7/2008 |
| JP | 2013-11200 | 1/2013 |
| JP | 5998577 | 9/2016 |
| WO | 2017/032541 | 3/2017 |

OTHER PUBLICATIONS

Written Opinion of the International Searching Authority dated Jun. 26, 2018 in International (PCT) Application No. PCT/JP2018/013226 with English translation.

* cited by examiner

PLANT MONITORING SYSTEM, PLANT OPERATION ASSISTANCE SYSTEM, PLANT MONITORING METHOD, AND PROGRAM

TECHNICAL FIELD

The present invention relates to a plant monitoring system, a plant operation assistance system, a plant monitoring method, and a program.

Priority is claimed on Japanese Patent Application No. 2017-071157, filed Mar. 31, 2017, the content of which is incorporated herein by reference.

BACKGROUND ART

Generally, in a case where a problem occurs in a plant and the like, information is shared by a supplier of a plant equipment (hereinafter, referred to as a "supplier") and a user of the plant equipment (hereinafter, referred to as a "user"), and various solutions are taken. In addition, even when a problem and the like do not occur, various pieces of information may be shared by the supplier, the user, and the like in a case where data is newly acquired, or the like.

In such a case, the user may present various types of data obtained by using the plant equipment to the supplier, and the supplier and the user may discuss and examine the data and then may execute a program or the like on which both the supplier and the user agree in advance to deal with it.

Meanwhile, Patent Literature 1 discloses a technique for automatically executing a program.

CITATION LIST

Patent Literature

[Patent Literature 1]
Japanese Unexamined Patent Application, First Publication No. 2004-21658

SUMMARY OF INVENTION

Technical Problem

Incidentally, in a case where it is agreed in advance that a certain program is to be automatically executed when a specific problem or the like occurs, it is important for the program not to be tampered with thereafter. This is because there is a risk in executing the program when tampering prevention is not sufficiently secured.

However, in the related art, an automatic program execution technique having a function of securing anti-tampering has not been provided.

The present invention is contrived in view of the above-described problem, and an object thereof is to provide a plant monitoring system that monitors a plant by using a program for which anti-tampering is secured, and the like.

Solution to Problem

Consequently, in order to solve the above-described problem, the present invention adopts the following configuration.

A plant monitoring system of the present invention is a plant monitoring system configured to monitor a plant and includes a plurality of distributed recording units in which programs for transmitting at least a portion of a group of pieces of state monitoring information of the plant to a predetermined information processing device are previously recorded in a plurality of storage devices in a distributed manner, a determination unit configured to sequentially acquire the pieces of state monitoring information and determine whether or not the acquired pieces of state monitoring information satisfy a program execution condition prescribed in advance, and an execution request output unit configured to output a program execution request corresponding to the program execution condition to the distributed recording units in a case where the program execution condition is satisfied, in which each of the distributed recording units includes a program execution processing unit configured to read and execute the program designated by the execution request in a case where the execution request is output.

In addition, a plant operation assistance system of the present invention is a plant operation assistance system configured to perform operation assistance of a plant and includes a plurality of distributed recording units in which programs for outputting operation assistance information on the plant are previously recorded in a plurality of storage devices in a distributed manner, and an execution request output unit configured to output an execution request to the distributed recording units in a case where the program execution request is received, in which the distributed recording units includes an agreement determination processing unit configured to determine whether or not a predetermined agreement condition determined between a provider of the program and the agreement determination processing unit is satisfied with regard to execution of the program designated by the execution request, a program execution processing unit configured to execute the designated program in a case where the agreement condition is satisfied, and an execution history recording processing unit configured to record pieces of execution history information indicating that the program has been executed in a distributed manner in a case where the program is executed in response to the execution request.

Further, in the plant operation assistance system of the present invention, the program execution processing unit is configured to execute each of a plurality of programs recorded in a distributed manner, may compare arithmetic values obtained by executing the programs with each other, and determine whether to output the arithmetic values or not in accordance with a comparison result.

Further, in the plant operation assistance system of the present invention, the distributed recording unit includes an approving unit configured to output an approval result of the received execution request to the distributed recording units, and the agreement determination unit is configured to determine whether or not a predetermined agreement condition is satisfied on the basis of the approval result output by the approving unit.

Further, in the plant operation assistance system of the present invention, currency substitution information increasing and decreasing depending on execution of the program is recorded in the distributed recording unit.

Further, in the plant operation assistance system of the present invention, the predetermined agreement condition includes a condition regarding whether or not predetermined information is shared at or after a time which is a fixed period before a time when the execution request is executed.

Further, in the plant operation assistance system of the present invention, the program recorded in the distributed recording unit is encrypted, and the plant operation assistance system further includes an encryption key output unit configured to output a key for decrypting a code to the distributed recording units from the provider of the program when the agreement condition is satisfied.

In addition, a plant monitoring method of the present invention includes a distributed recording step of previously recording programs for transmitting at least a portion of a group of pieces of state monitoring information of the plant to a predetermined information processing device in a plurality of storage devices in a distributed manner, a determination step of sequentially acquiring the pieces of state monitoring information and determining whether or not the acquired pieces of state monitoring information satisfy a program execution condition prescribed in advance, an execution request output step of outputting a program execution request corresponding to the program execution condition to the distributed recording unit in a case where the program execution condition is satisfied, and a program execution processing step of causing to read and execute the program designated by the execution request in a case where the execution request is output.

In addition, a program of the present invention causes a computer of a plant monitoring system configured to monitor a plant to function as distributed recording unit configured to previously record programs for transmitting at least a portion of a group of pieces of state monitoring information of the plant to a predetermined information processing device in a plurality of storage devices in a distributed manner, determination unit configured to sequentially acquire the pieces of state monitoring information and determine whether or not the acquired pieces of state monitoring information satisfy a program execution condition prescribed in advance, execution request output unit configured to output a program execution request corresponding to the program execution condition to the distributed recording unit in a case where the program execution condition is satisfied, and program execution processing unit configured to cause to read and execute the program designated by the execution request in a case where the execution request is output.

Advantageous Effects of Invention

According to a plant monitoring system of the present invention, it is possible to monitor a plant by using a program for which anti-tampering is secured.

DESCRIPTION OF EMBODIMENTS

First Embodiment

Hereinafter, a plant monitoring system and a plant monitoring method according to a first embodiment of the present invention will be described with reference to FIGS. 1 to 5.

<Plant Monitoring System>

Figure 1:
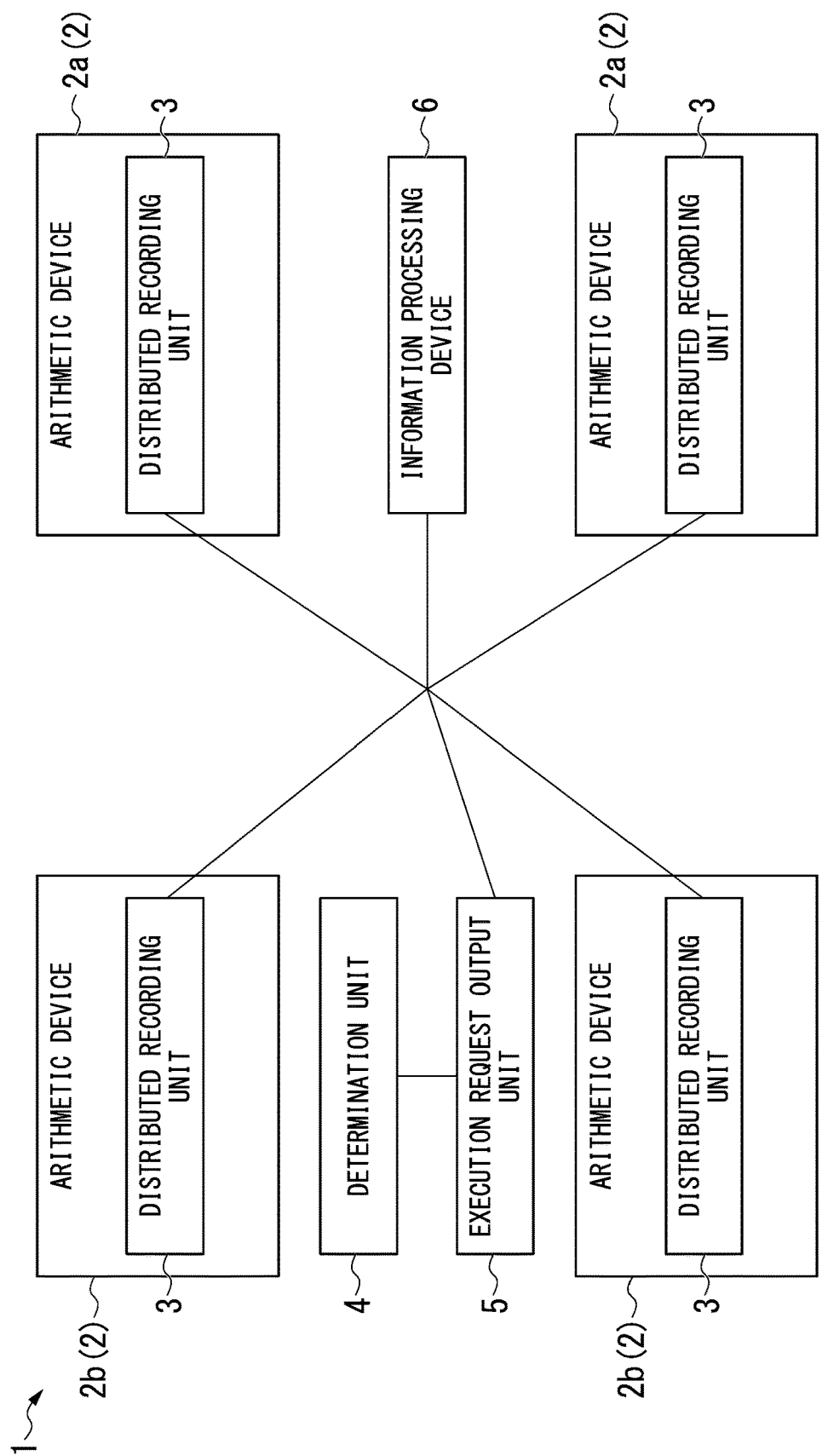
FIG. 1 is a diagram showing a plant monitoring system according to a first embodiment of the present invention.

As shown in FIG. 1, a plant monitoring system 1 of the present embodiment includes a distributed recording unit 3 provided in an arithmetic device 2, a determination unit 4, an execution request output unit 5, and an information processing device 6.

The distributed recording unit 3 is provided in each of a plurality of arithmetic devices 2, and one storage system is constituted with each of the plurality of distributed recording units 3 as a node. The distributed recording unit 3 is recorded in an arithmetic device 2a of a plant provider and an arithmetic device 2b of a plant user. The arithmetic device 2 includes an input device, not shown in the drawing, which receives a user's input and a display device, not shown in the drawing, that displays and output various pieces of information. Here, the arithmetic device 2 is an example of a storage device.

Figure 2:
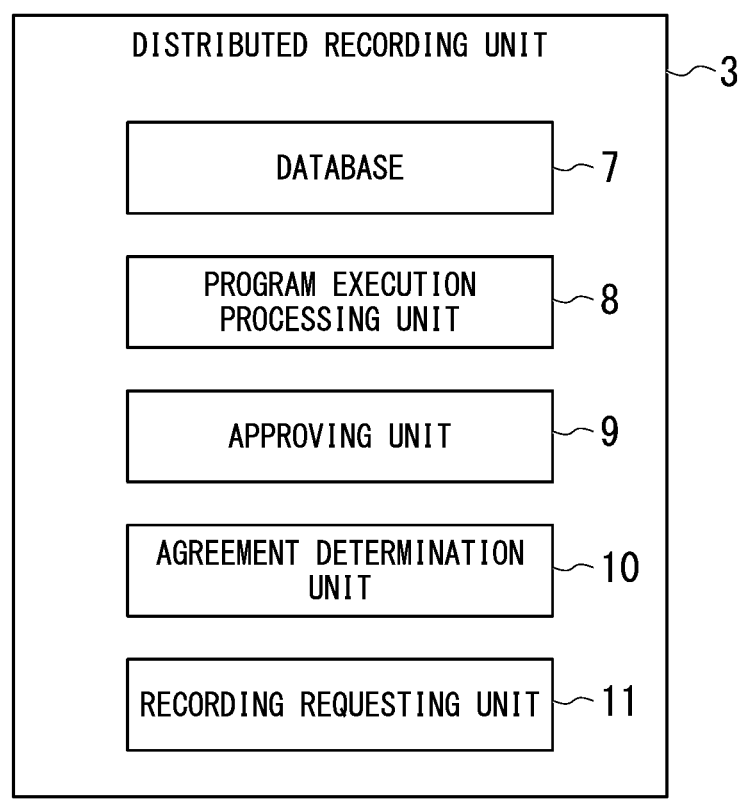
FIG. 2 is a diagram showing a portion of the plant monitoring system according to the first embodiment of the present invention.

In addition, the distributed recording unit 3 is provided with a database 7, a program execution processing unit 8, an approving unit 9, an agreement determination unit 10, and a recording requesting unit 11 as shown in FIG. 2.

Figure 3:
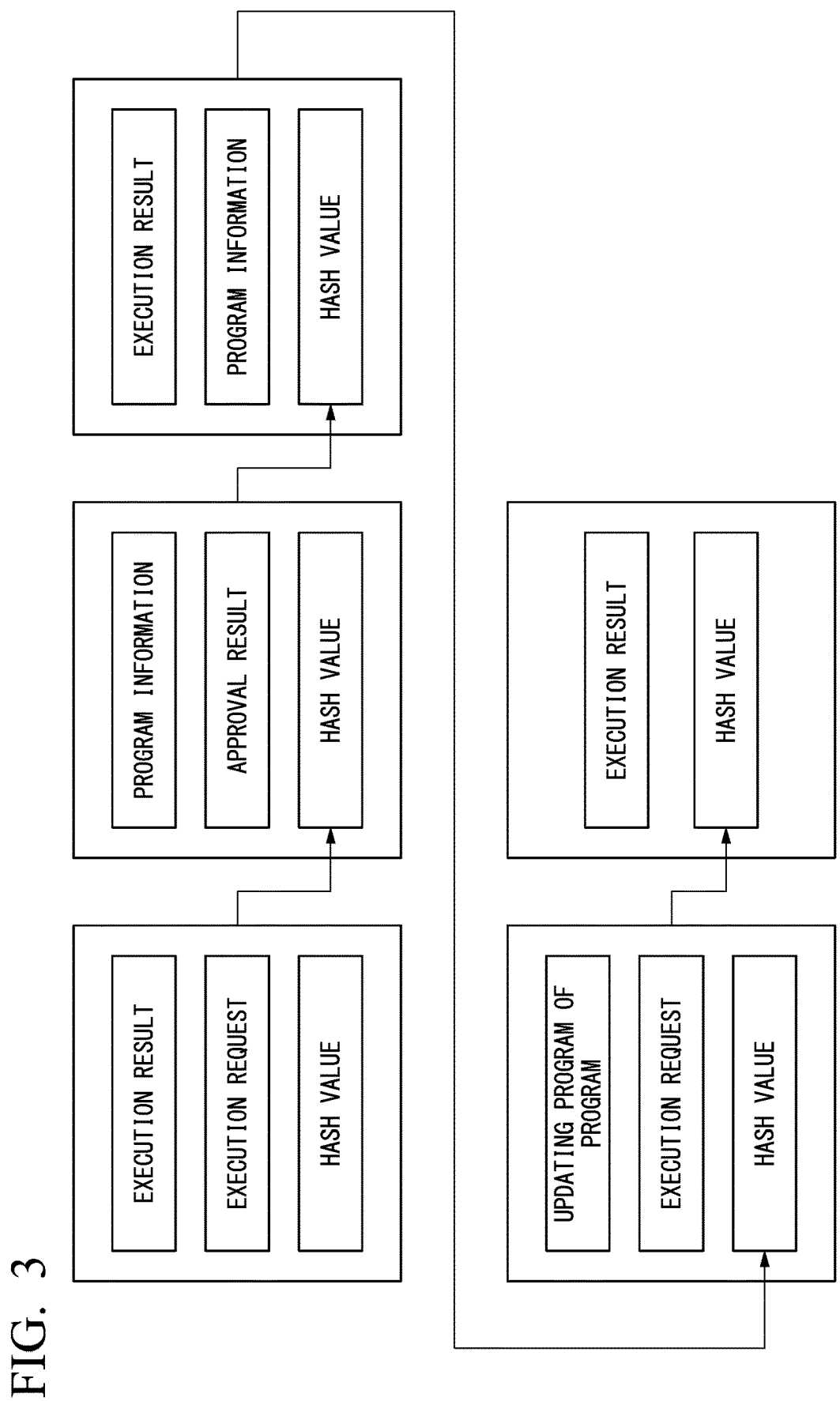
FIG. 3 is a diagram showing a portion of the plant monitoring system according to the first embodiment of the present invention.

Various pieces of information can be recorded in block-like data recorded in the database 7 of the distributed recording unit 3 as shown in FIG. 3. For example, it is possible to record various pieces of information such as a program created based on an agreement between the plant provider and the plant user in advance, an execution request output by an execution request output unit, an approval result output by an approving unit, and an execution result of a program executed by a program execution processing unit.

In addition, blocks recorded in the database 7 are connected to each other in a chain shape. In FIG. 3, a state where five blocks are connected to each other in a chain shape is shown.

For example, as the program created based on an agreement between the plant provider and the plant user in advance, a program for providing a portion of a group of state monitoring information of the plant to the information processing device 6 of the plant provider, for example, when a predetermined condition occurs, or the like may be considered. Examples of the state monitoring information may include sensor measurement values such as a piping temperature, a pressure, and a valve opening.

The blocks are not required to be blocks in which only particularly meaningful information is collected. For example, a certain program and execution results or the like executed by another program may be stored in the same block.

Here, the blocks also include hash values of blocks registered in the database 7 immediately previously.

The hash value is a non-regular value obtained from the original data through a fixed calculation procedure, and the hash value has a characteristic in which the same hash value is necessarily obtained from the same data, and different hash values are necessarily obtained from different pieces of data.

In this manner, it is possible to prove that data (a program is included) included in the blocks has not been tampered with by including a hash value of the previous block in each block to check connection of the hash values of the blocks in the past. For example, when a certain block is tampered with, the hash value of the block becomes a different value and the hash value does not match a hash value stored in the subsequent block, and thus it is possible to easily detect tampering. In contrast, if a hash value stored in each block is consistent with a hash value obtained from the previous block through an arithmetic operation, it is proof that the block has not been tampered with.

The program execution processing unit 8 is a functional unit that reads and executes a program designated by an execution request which is output by the execution request output unit 5. Since the execution request output unit 5 specifies a specific program using a program ID and outputs an execution request, the program execution processing unit 8 acquires an address value of a block on the database 7 in which the program is recorded on the basis of the program ID and reads the program from the database 7 to execute the program on the basis of the address value. Details thereof will be described later.

The approving unit 9 is a functional unit that determines whether or not the execution request output by the execution request output unit 5 and a recording request output by the recording requesting unit 11 satisfy desired requirements, and outputs approval results to the distributed recording units 3.

Regarding the desired condition, requirements may be changed depending on content of the execution request, or the reception of an input by a user may be set as the condition.

The agreement determination unit 10 is a functional unit that determines whether or not a predetermined agreement condition determined in advance is satisfied.

An agreement condition may also be, for example, a condition regarding whether or not the number of approval results indicating approval and output from the approving unit 9 has reached a predetermined ratio of a total number of arithmetic devices 2, more specifically, whether or not the number of approval results has reached two thirds or more.

The recording requesting unit 11 is a functional unit that outputs a recording request having content indicating that specific information is recorded in the database 7 to the distributed recording units 3.

The determination unit 4 is a functional unit including a sensor that sequentially acquires pieces of state monitoring information and determines whether or not the acquired state monitoring information satisfies a predetermined program execution condition. The program execution condition is a condition which is determined in advance through agreement between a plant provider and a plant user.

The execution request output unit 5 is a functional unit outputting a program execution request to the distributed recording units 3 when a program execution condition is satisfied.

It is assumed that the determination unit 4 and the execution request output unit 5 are provided on the plant user side, but the present invention is not necessarily limited to such a mode.

The information processing device 6 is a device that receives state monitoring information transmitted to the plant provider side using a program executed by the program execution processing unit 8. Although the information processing device 6 and the arithmetic device 2 are described separately in the present embodiment, the arithmetic device 2a on the plant provider side may also serve as the information processing device 6.

<Plant Monitoring Method>

Next, a plant monitoring method using the above-described plant monitoring system will be described. First, a monitoring method at the stages of program registration and program updating will be described instead of a monitoring method at the stage of program execution.

(Step S1)

Figure 4:
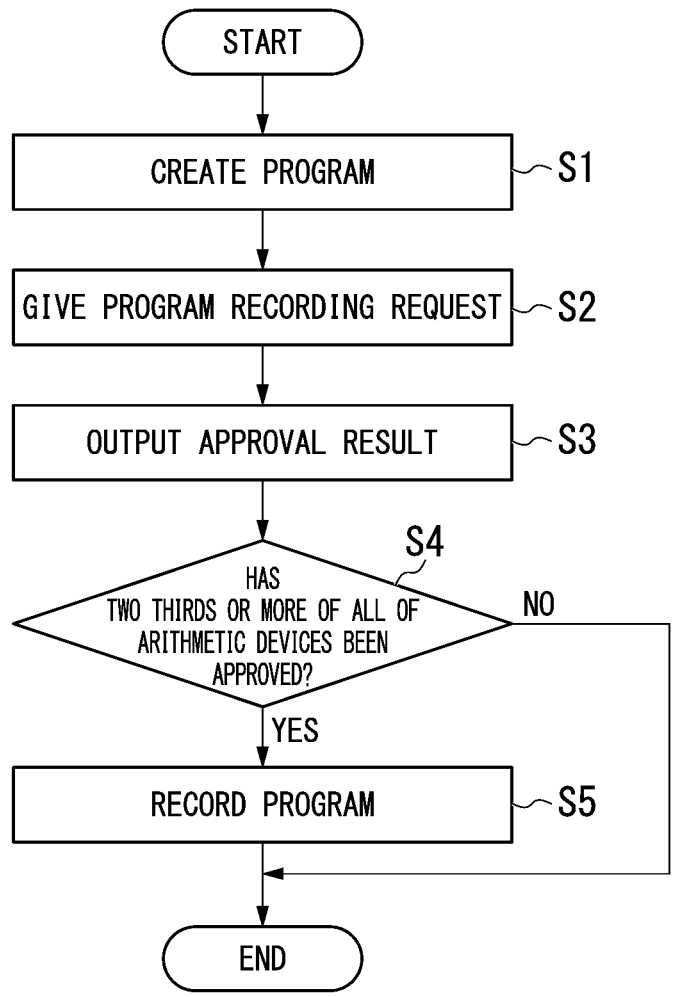
FIG. 4 is a flowchart of a plant monitoring method according to the first embodiment of the present invention.

First, as shown in FIG. 4, in the plant monitoring method of the present embodiment, the plant provider and the plant user previously agree on a program and a program execution condition corresponding to the program to create the program.

The program mentioned herein refers to content indicating that a group of state monitoring information of the plant is transmitted to the information processing device 6 on the plant provider side.

For example, the program may be a program executing transmission of a piping temperature to the plant provider. In this case, a condition that the piping temperature is set to be equal to or higher than a fixed temperature is agreed upon in advance as a program execution condition.

(Step S2)

Next, the recording requesting unit 11 outputs a recording request for recording the program to the distributed recording units 3 through the operation of a program provider.

(Step S3)

Next, an input from an operator of the arithmetic device 2 is waited for, and the approving unit 9 outputs an approval result regarding whether or not the recording request output by the recording requesting unit 11 satisfies a desired requirement to the distributed recording units 3.

(Step S4)

Next, the agreement determination unit determines whether or not the number of outputs indicating the approval of the recording requests output from the approving units 9 in step S3 has reached two thirds or more of all of the arithmetic devices 2. The proportion of two thirds is only an example, and another proportion may be adopted. For example, the approval may be approval corresponding to the majority of the arithmetic devices 2.

When the number of outputs has not reached two thirds or more of the arithmetic devices 2, the program is not stored in the database, and the processing is terminated.

(Step S5)

As a result of the determination in step S4, in a case where the number of outputs has reached two thirds or more of all of the arithmetic devices 2, the program is recorded in the database 7 of each distributed recording unit 3 as a block. This block includes at least a hash value of the previous block in addition to the program, and may include various other pieces of information.

Further, in the present step, an address value (a value indicating a position on the database 7) of the block having the program recorded therein is also acquired. In addition, the address value is separately recorded in the database 7 in association with a program ID for identifying the program.

As described above, in the present embodiment, various pieces of information are stored for each block, and the program is stored in the database 7 in which the blocks are continuously connected in a chain shape and stored on the basis of the hash values.

As a result, the program can be prevented from being tampered with.

Further, in the present embodiment, when the program is stored in the database 7 or the program is updated, the consent of two thirds or more of all of the arithmetic devices 2 is required.

As a result, for example, when the plant provider and the plant user each have half of the arithmetic devices 2, neither can independently register or update the program when the consent of two thirds or more of the arithmetic devices 2 is requested. A numerical value of two thirds is an example, and can be appropriately changed to a desired value.

Thereby, both the plant provider and the plant user can prevent an automatic execution program not recognized by the plant provider and the plant user from being stored.

In the present embodiment, since the content of a block registered once cannot be modified, a program newly and separately updated is registered in a new block through steps S1 to S5 described above when a registered program is updated. That is, two types of programs of an old program before updating and a new program after updating are stored in the database 7.

Therefore, at the stage of executing a program, a program is specified and executed on the basis of an address value in which a new program after updating is stored instead of an address value of a block in which an old program before updating is stored.

(Step S11)

Next, the monitoring method at the stage of program execution will be described.

Figure 5:
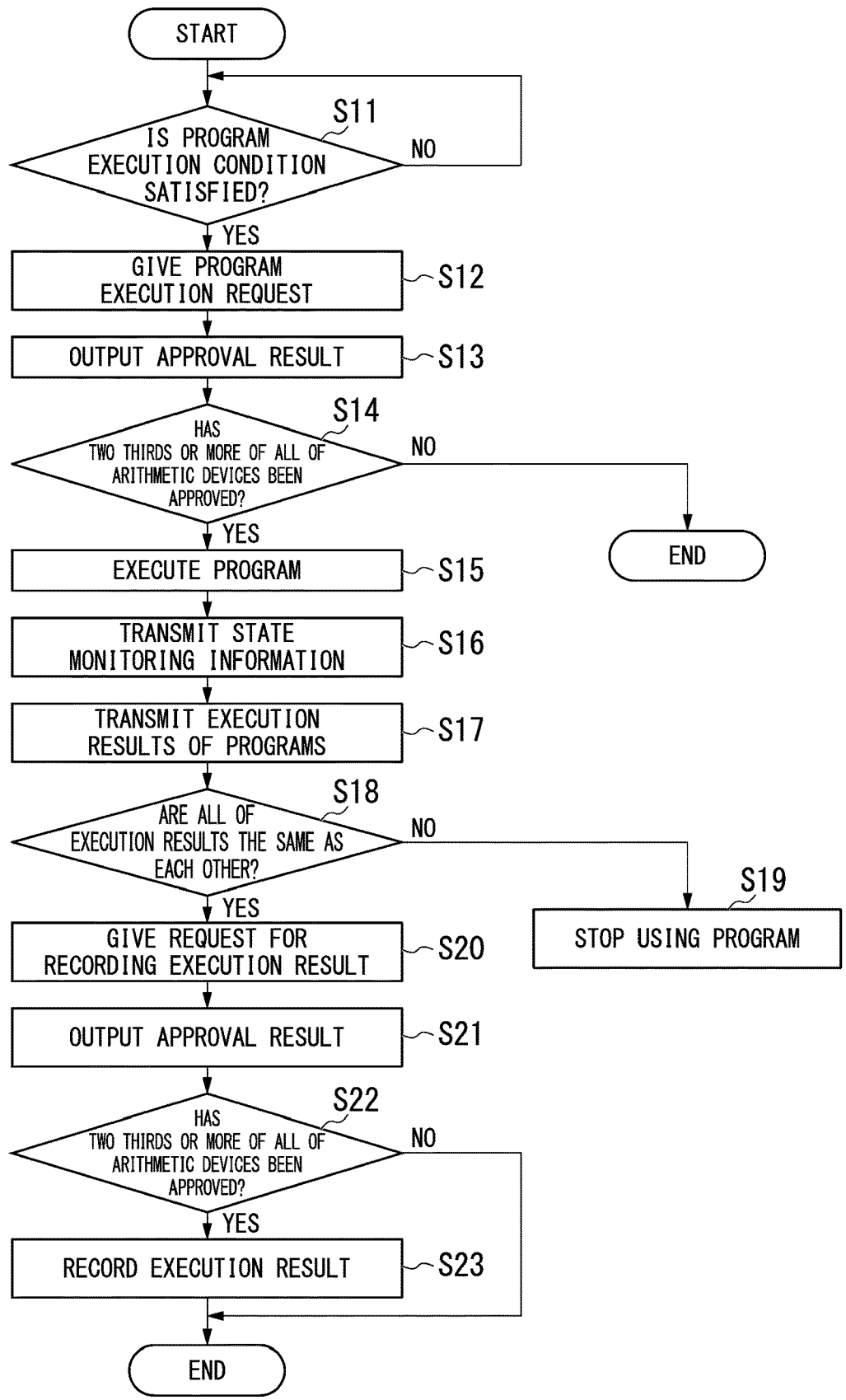
FIG. 5 is a flowchart of the plant monitoring method according to the first embodiment of the present invention.
Figure 6:
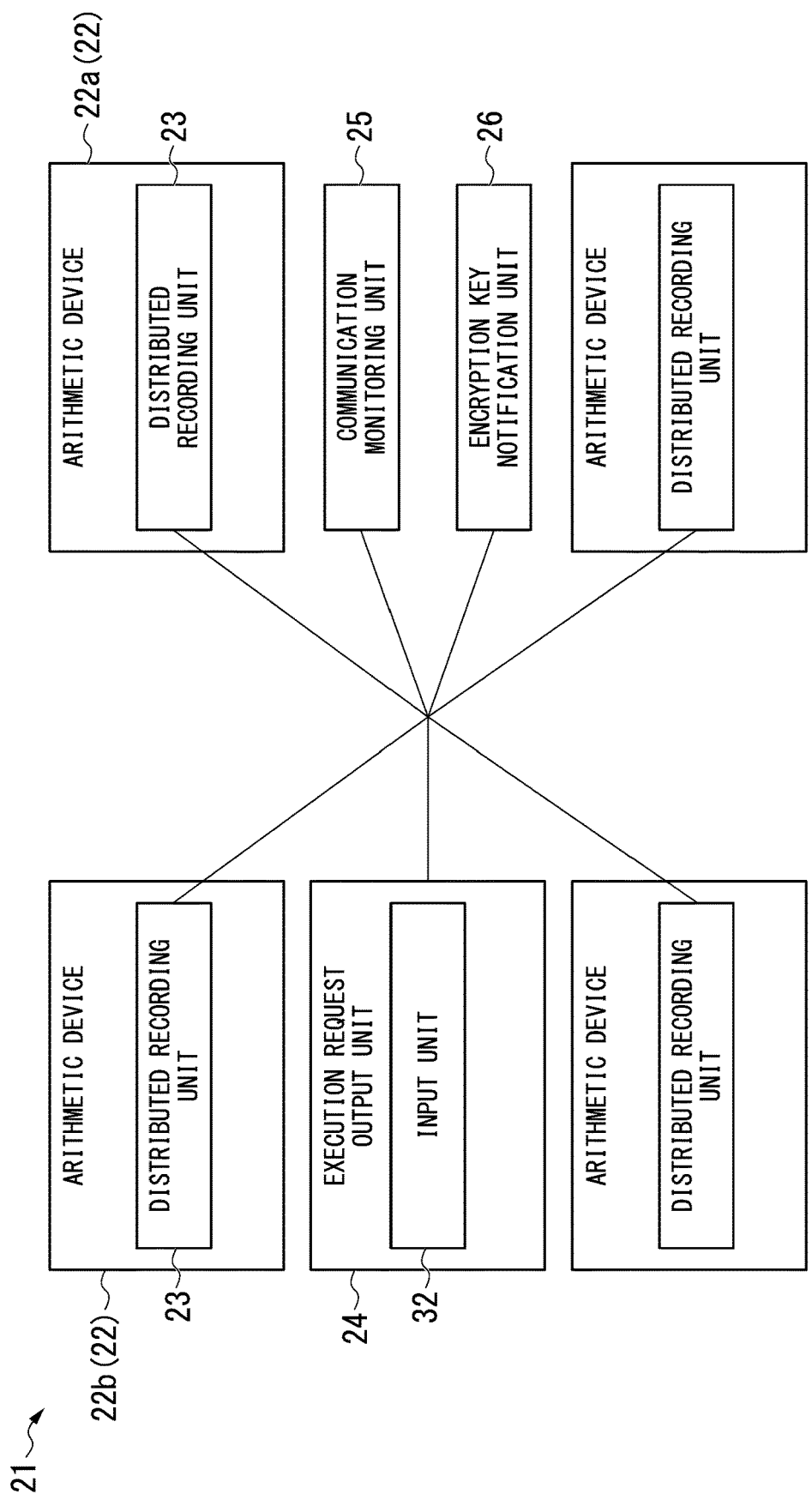
FIG. 6 is a diagram showing a plant operation assistance system according to a second embodiment of the present invention.

First, as shown in FIG. 5, the determination unit 4 determines whether or not a predetermined program execution condition is satisfied. This determination is performed on the basis of, for example, a value of a temperature sensor included in the determination unit 4.

It is preferable that this determination be automatically performed by performing monitoring using a sensor included in the determination unit 4 at all times without human work.

When the program execution condition is not satisfied, this step is repeated.

(Step S12)

Next, as a result of the determination in step S11, when the program execution condition is satisfied, the execution request output unit 5 outputs a program execution request to the distributed recording units 3. The program execution request output unit 5 designates a program ID to specify a program and give a program execution request.

(Step S13)

Next, the approving unit 9 determines whether to approve the program execution request output from the execution request output unit 5 and outputs an approval result. In this case, it is preferable to eliminate the need for human work, and for example, whether or not the program execution request given from the execution request output unit 5 or the like is considered to be a determination condition.

(Step S14)

Next, the agreement determination unit 10 determines whether or not the number of outputs indicating the approval of the program execution request output from the approving units 9 in step S13 has reached two thirds or more of all of the arithmetic devices 2. A numerical value of two thirds is an example, and can be appropriately changed to a desired value. In a case where the number of outputs has not reached two thirds or more of the arithmetic devices 2, the program is not executed, and the processing is terminated.

(Step S15)

As a result of the determination in step S14, in a case where the number of outputs has reached two thirds or more of all of the arithmetic devices 2, the program execution processing unit 8 reads and executes a program designated by the program execution request output by the execution request output unit 5.

Specifically, since a program ID and an address value are recorded in the database 7 in association with each other with respect to each program stored in the database 7, the program execution processing unit 8 acquires an address value of the program on the basis of the program ID output by the execution request output unit 5. In addition, the program execution processing unit 8 specifies a block in which the program is recorded on the basis of the address value, and reads and executes the program.

(Step S16)

Next, state monitoring information is transmitted to the information processing device 6 using the program executed by the program execution processing unit 8. For example, a piping temperature may be transmitted to the information processing device 6.

(Step S17)

Next, the program execution processing units 8 output execution results of programs to other distributed recording units 2.

(Step S18)

Next, the program execution processing units 8 determine whether or not all of the execution results received in step S17 are the same.

(Step S19)

As a result of the determination in step S18, in a case where the execution results received from other distributed recording units 2 include different execution results, the program execution processing unit 8 outputs the occurrence of an execution error to the distributed recording units 2.

In this case, since there is at least one different execution result, programs executed by the program execution processing unit 8 of all of the distributed recording units 2 are stopped and terminated.

Instead of step S18 and the present step, in a case where the execution results received in step S17 include execution results matching each other at more than a predetermined ratio, the execution results may be accepted and control to proceed to the next step S20 may be performed. Examples of the predetermined ratio may include two thirds and the like.

(Step S20)

As a result of the determination in step S18, in a case where all of the execution results are the same, the recording requesting unit 11 outputs a recording request for recording the execution results in the database 7 to the distributed recording units 2.

(Step S21)

Next, the approving unit 9 outputs an approval result regarding whether or not the recording request output by the recording requesting unit 11 satisfies a desired requirement to the distributed recording units 3. The desired requirement may be considered to be, for example, a formal requirement such as confirmation regarding whether or not it is a recording request from the recording requesting unit 11.

(Step S22)

Next, the agreement determination unit 10 determines whether or not the number of outputs indicating the approval of the recording requests output from the approving units 9 in step S21 has reached two thirds or more of all of the arithmetic devices 2.

When the number of outputs has not reached two thirds or more of the arithmetic devices 2, the execution result is not stored in the database 7, and the processing is terminated. A numerical value of two thirds is an example, and can be appropriately changed to a desired value.

(Step S23)

As a result of the determination in step S22, in a case where the number of outputs has reached two thirds or more of all of the arithmetic devices 2, the execution result is recorded in the database 7 of each distributed recording unit 3 as a block, and the processing is terminated.

In the present embodiment, there is no intervention of a person's determination from when the determination unit 4 determines whether or not a predetermined program execution condition is satisfied to when a program is executed, and thus it is possible to smoothly execute the program.

Thereby, in the related art, it is possible to reduce time for discussion or the like performed between a plant provider and a plant user when a problem occurs, to achieve a reduction in costs, to rapidly eliminate the problem, and to reduce a system down time of a plant.

Second Embodiment

Next, a plant operation assistance system 21 and a plant operation assistance method according to a second embodiment of the present invention will be described.

Description of the same portions as those in the first embodiment will be omitted as appropriate.

<Plant Operation Assistance System>

A plant operation system of the present embodiment is different from the plant monitoring system according to the first embodiment, and includes a distributed recording unit 23 provided in an arithmetic device 22, an execution request output unit 24, a communication monitoring unit 25, and an encryption key notification unit 26.

Figure 7:
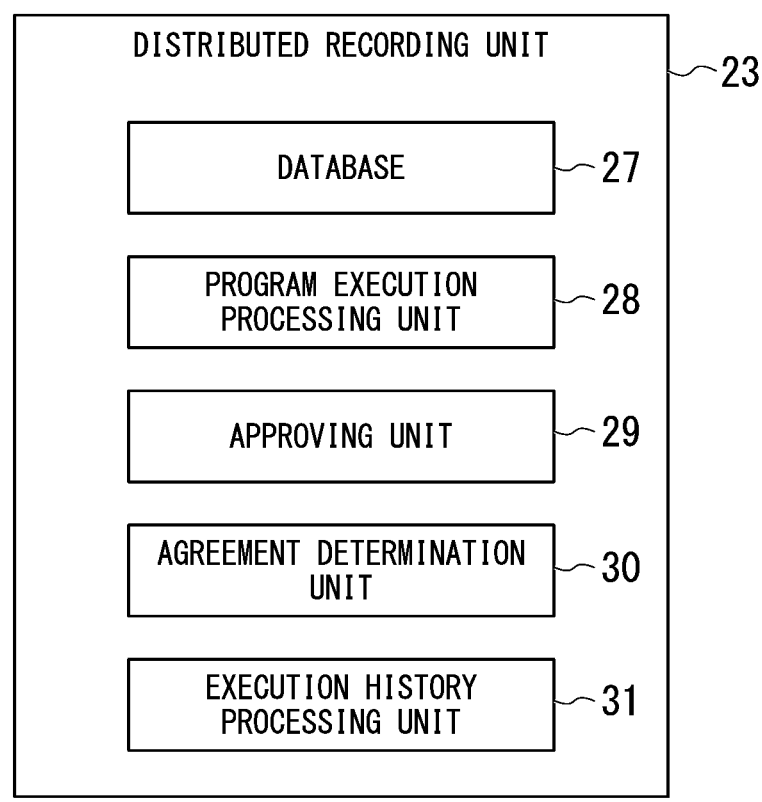
FIG. 7 is a diagram showing a portion of the plant operation assistance system according to the second embodiment of the present invention.

As shown in FIG. 7, the distributed recording unit 23 includes a database 27, a program execution processing unit 28, an approving unit 29, an agreement determination unit 30, and an execution history processing unit 31.

The approving unit 29 and the agreement determination unit 30 are the same as those in the first embodiment, and thus the description thereof will be omitted. Similarly to the first embodiment, data is stored for each block in the database 27, and the blocks are connected to each other in a chain shape.

Various pieces of information can be recorded in the blocks of the present embodiment. However, regarding at least data, data itself is not stored, and a hash value of the data is stored.

In addition, a program for outputting operation assistance information regarding a plant is also stored in the database 27 of the present embodiment. Examples of the operation assistance information may include information regarding estimated power demand, operational analysis, and failure diagnosis.

In addition, regarding the program for outputting the operation assistance information on the plant, a full service program capable of outputting operation assistance information sufficiently useful for a user and a limited service program capable of outputting only limited operation assistance information. Examples of the full service program may include a program for outputting failure diagnosis results, and the like, and examples of the limited service program may include a program for simply outputting an average value, a distributed value, and the like of data, and the like.

In addition, the program stored in the database 27 in the present embodiment is encrypted by a program provider.

The execution request output unit 24 includes an input unit 32 that receives an input from an operator who is a plant user. In addition, the execution request output unit 32 is also a functional unit that outputs an execution request to the distributed recording unit 23 in a case where the execution request indicating that the program for outputting the operation assistance information on the plant is desired to be executed is received from an operator.

The communication monitoring unit 25 is a functional unit that monitors whether or not the distributed recording units 23 provided in the respective arithmetic devices 22 can communicate with other distributed recording units 23.

<Plant Operation Assistance Method>

(Step S31)

Next, a plant operation assistance method using the plant operation assistance system 21 of the present embodiment will be described.

Figure 8:
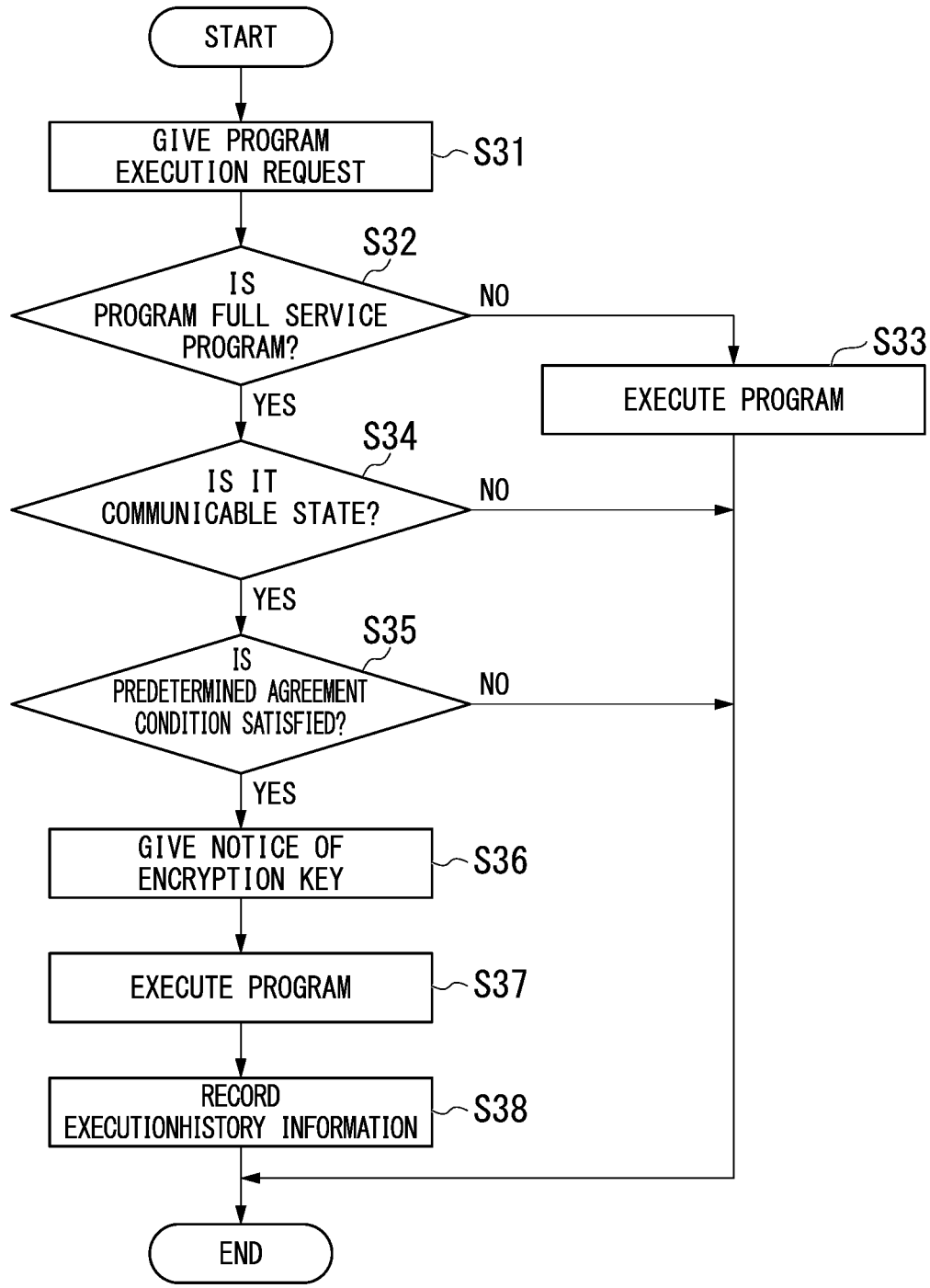
FIG. 8 is a flowchart of a plant operation assistance method according to the second embodiment of the present invention.

First, as shown in FIG. 8, the plant user operates the input unit 32 to request the execution request output unit to execute a desired program.

Further, in a case where the execution request is received, the execution request output unit 24 outputs the execution request to the distributed recording unit 23.

(Step S32)

Next, it is determined whether or not the program requested by the execution request output unit 24 in step S1 is a full service program.

(Step S33)

As a result of the determination in step S32, in a case where the program is not a full service program but a limited service program, the program execution processing unit 28 executes the program in accordance with the execution request given in step S31 and terminates the processing.

(Step S34)

As a result of the determination in step S32, in a case where the program is a full service program, the communication monitoring unit 25 subsequently determines whether or not the plant provider and the plant user are in a communicable state.

When the plant provider and the plant user can communicate with each other, the processing proceeds to step S35. When the plant provider and the plant user are in an incommunicable state, the processing is terminated, and the full service program is not executed.

(Step S35)

Next, the agreement determination unit 30 determines whether or not a predetermined agreement condition is satisfied with respect to the execution of a program.

The predetermined agreement condition is a condition which is determined in advance between the plant provider and the plant user. Examples of the predetermined agreement condition may include a condition regarding whether or not the plant provider gives an approval, a condition whether or not a charge is paid, and a condition regarding whether or not holding plant information is provided.

In order to determine whether or not the plant provider gives an approval, for example, it is considered that determination is performed using the number of outputs of approval results obtained by the approving unit 29 for the execution request output by the execution request output unit 24.

In a case where the number of arithmetic devices 22a on the plant provider side and the number of arithmetic devices 22b on the plant user side are the same, the predetermined agreement condition is not satisfied unless at least someone on the plant provider side give an approval, when the condition is that an approval result obtained by the approving unit 29 indicates that the number of outputs reaches two thirds or more of all of the arithmetic devices 22.

In order to determine whether the plant user has paid a charge to the plant provider, for example, a method of recording and processing a virtual currency (currency substitution information) in the database 27 is considered.

Figure 9:
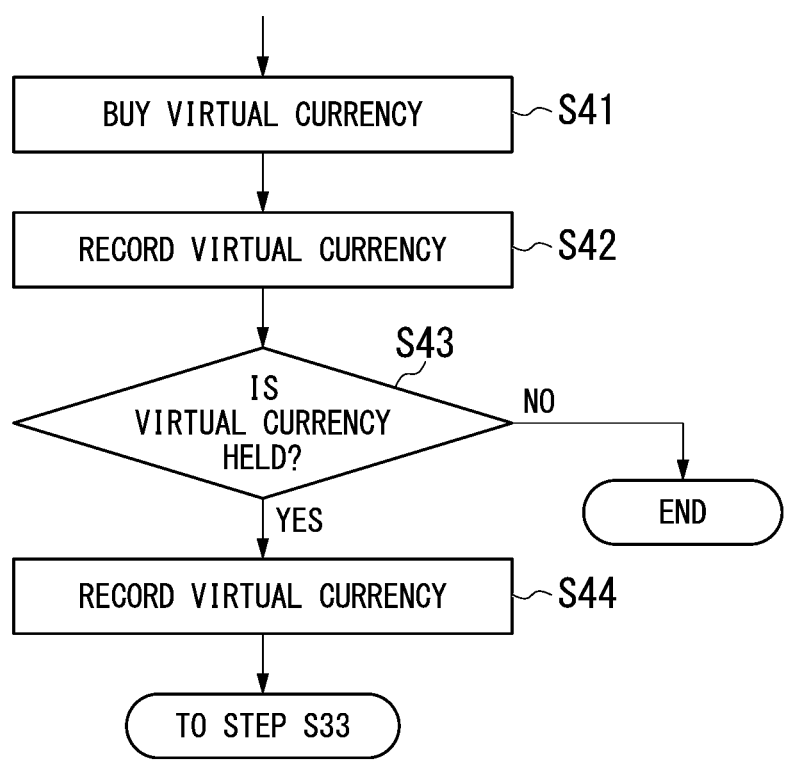
FIG. 9 is a flowchart of the plant operation assistance method according to the second embodiment of the present invention.
Figure 10:
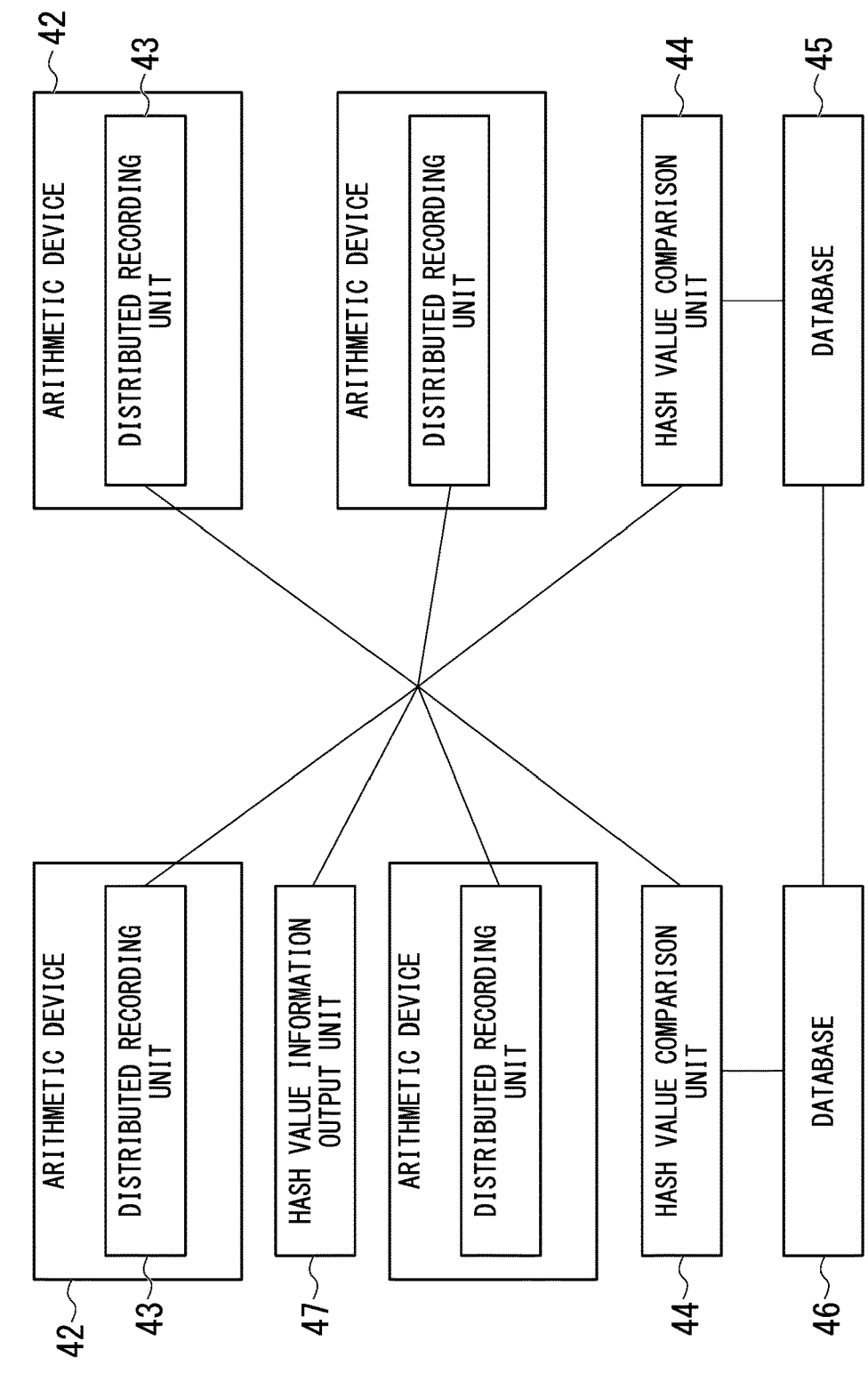
FIG. 10 is a diagram showing a plant operation assistance system according to a third embodiment of the present invention.
Figure 11:
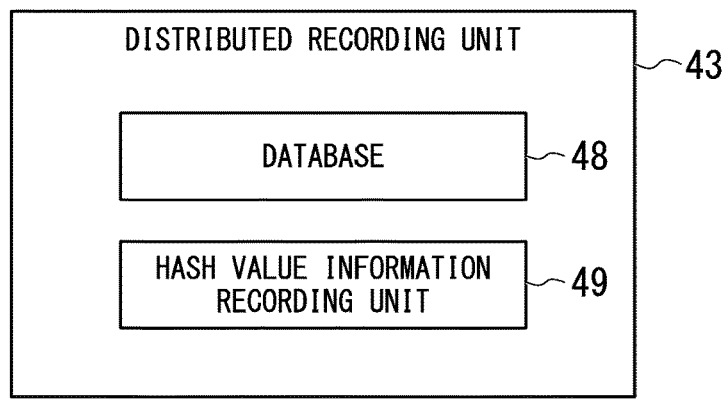
FIG. 11 is a diagram showing a portion of the plant operation assistance system according to the third embodiment of the present invention.

Specifically, as shown in FIG. 9, the plant user actually pays a charge to the plant provider to buy a virtual currency (Step S41). In addition, in order to record the virtual currency in the database 27, the plant provider's approval is required, so that the plant provider's approval is obtained to record the virtual currency in the database 27 (Step S42).

In addition, it is determined whether or not the plant user holds a virtual currency under a condition that the plant user holds a virtual currency in the database 27 as the predetermined agreement condition for a program execution request (Step S43). In addition, a recorded virtual currency is automatically reduced in actually executing a program (Step S44).

In this manner, it is possible to determine whether the plant user has paid a charge to the plant provider.

Further, in order to determine whether or not holding plant information is provided, for example, it may be determined whether or not the data is stored in the database 27. Specifically, it is conceivable to determine whether or not the data has been stored at or after the time which is a fixed period before a time when an execution request is given by the execution request output unit 24.

(Step S36)

As a result of step S35, in a case where the predetermined agreement condition is satisfied, the encryption key notification unit 26 notifies the distributed recording units 23 of an encryption key.

As a result of step S35, in a case where the predetermined agreement condition is not satisfied, the processing is terminated.

(Step S37)

Next, in a case where a notice of the encryption key is given, the program execution processing unit 28 executes the full service program in accordance with an execution request.

(Step S38)

Next, the execution history processing unit 31 records execution history information indicating that the program has been executed in the database 27 and terminates the processing.

Examples of the execution history information may include a hash value of an execution result obtained by executing the program, and the like.

In the present embodiment, since the execution history information is recorded in the database 27 of the distributed recording unit 23 whenever the program is executed, the plant provider can reliably automatically know that the plant user has executed the program, and it is possible to reduce management costs.

In addition, since not only the execution result itself of the program but also a hash value of the execution result is recorded in the database 27, there is no problem even when data leaks to the outside, and a load on a communication path can be reduced.

In addition, since a communication state between the plant user and the plant provider is monitored by the communication monitoring unit 25, it is possible to prevent the full service program from being executed without permission of the plant provider. On the other hand, since the limited service program can be executed even when the communication state is interrupted due to the circumstances on the plant provider side, it is possible to reduce dissatisfaction of the plant user.

In addition, since the program recorded in the database 27 is encrypted and an encryption key is notified only when the predetermined agreement condition for the execution of the program is satisfied, the content of the program can be managed as a secret.

In the above-described embodiment, since only a hash value of an execution result is recorded in the database 27 instead of recording an execution result, there is a possibility that the execution result and records on the database 27 may be inconsistent with each other. Consequently, in the plant user, the execution result may be recorded in another database, a hash value may be acquired on a regular basis with respect to the execution result recorded in the database, the value and a hash value stored in the database 27 may be compared with each other, and a notification may be given when the values are inconsistent with each other.

Third Embodiment

Next, a plant operation assistance system 41 and a plant operation assistance method according to a third embodiment of the present invention will be described.

The present embodiment mainly has a feature that it is automatically determined whether or not an operation state and a maintenance state of a plant by a plant user are appropriate.

<Plant Operation Assistance System>

The plant operation assistance system 41 of the present embodiment includes a distributed recording unit 43 provided in an arithmetic device 42, a hash value comparison unit 44, a database 45 provided on a plant provider side, a database 46 provided on a plant user side, and a hash value information output unit 47.

In addition, the distributed recording unit 43 includes a database 48 and a hash value information recording unit 49.

Although various pieces of information are recorded in the database 48, hash values of operation information and maintenance information of a plant are mainly recorded in the present embodiment.

The hash value information recording unit 49 is a functional unit that stores a hash value received from the hash value information output unit 47 in the database 48.

The database 45 and the database 46 are configured so as to have the same contents by being synchronized with each other on a regular basis. In addition, operation information and maintenance information of the plant are recorded in the database 45 and the database 46. The operation information is information on plant operation conditions and the like, and the maintenance information is information on the frequency, method, and the like of maintenance.

The hash value comparison unit 44 is a functional unit that arithmetically operates the hash values of the operation information and the maintenance information stored in the database 45 and the database 46, compares the hash values with hash values stored in the database 48, and outputs an alert signal in a case where the hash values are inconsistent with each other as a result of the comparison.

The hash value information output unit 47 is a functional unit that outputs the hash values of the operation information and the maintenance information to the distributed recording unit 43.

<Plant Operation Assistance System>

(Step S41)

Next, a plant operation method of the present embodiment will be described.

Figure 12:
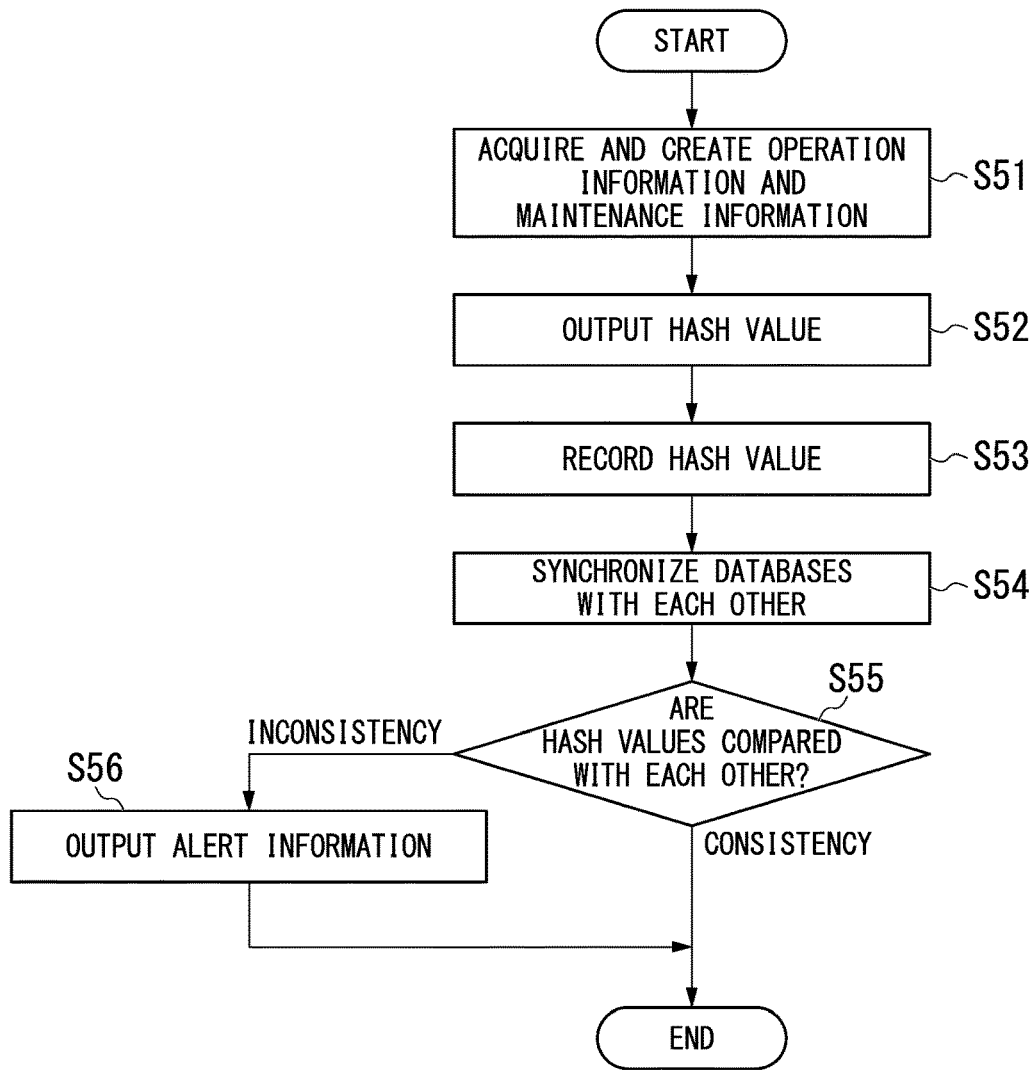
FIG. 12 is a flowchart of a plant operation assistance method according to the third embodiment of the present invention.

In the present embodiment, first, as shown in FIG. 12, operation information and maintenance information of the plant are acquired whenever the plant user operates the plant and performs maintenance of the plant, and these pieces of information are recorded in the database 46.

(Step S42)

Next, the hash value information output unit 47 arithmetically operates hash values of the operation information and the maintenance information and outputs the hash values to the distributed recording unit 43.

(Step S43)

Next, the hash value information recording unit 49 records the hash values received in step S42 in the database 48 of the distributed recording unit 43.

(Step S44)

Next, the database 46 and the database 45 are synchronized with each other so that the contents of the database 45 and the database 46 are equalized with each other.

(Step S45)

Next, the hash value comparison unit 44 arithmetically operates the hash values of the operation information and the maintenance information recorded in the database 45 and the database 46 and compares the values with hash values stored in the database 48.

(Step S46)

As a result of step S45, when the hash values are consistent with each other, the processing is terminated. When the hash values are inconsistent with each other, the hash value comparison unit 44 outputs alert information indicating that inconsistency occurs to the distributed recording unit 43, and the processing is terminated.

According to the present embodiment, since operation information and maintenance information are recorded in the database 48 as hash values, it is possible to prevent these pieces of information from being fraudulently falsified.

As a result, when a problem occurs in a plant, a plant provider can also immediately determine whether or not a problem has occurred in operation or maintenance, and it is possible to reduce a time for determining the acceptance of a claim on the plant provider side.

Although the present invention has been described on the basis of the embodiments, the present invention is not limited to the above-described embodiments, and it is needless to say that the present invention can be modified in various ways without departing from the scope of the present invention.

In addition, a process of each processing in the plant monitoring system 1 and the plant operation assistance systems 21 and 41 described above is stored in a computer-readable recording medium in a format of a program, and the above-described processing is performed by a computer reading the program. Here, the computer-readable recording medium refers to a magnetic disk, a magneto-optical disk, a CD-ROM, a DVD-ROM, a semiconductor memory, or the like. In addition, the computer program may be distributed to the computer through a communication line, and the computer having the distributed program may execute the program.

In addition, the above-described program may be a program for realizing some of the above-described functions. Further, the program may be a so-called differential file (differential program) capable of being realized in combination with a program recorded in a computer system in advance.

INDUSTRIAL APPLICABILITY

The present invention is applicable to all plant monitoring systems and all plant operation assistance systems.

REFERENCE SIGNS LIST

1 Plant monitoring system
2, 22, 42 Arithmetic device
3, 23, 43 Distributed recording unit
4 Determination unit
5, 24 Execution request output unit
6 Information processing device
7, 27, 45, 46, 48 Database
8, 28 Program execution processing unit
9, 29 Approving unit
10, 30 Agreement determination unit
11 Recording requesting unit
21, 41 Plant operation assistance system
25 Communication monitoring unit,
26 Encryption key notification unit
31 Execution history processing unit
44 Hash value comparison unit
47 Hash value information output unit
49 Hash value information recording unit

The invention claimed is:

1. A plant monitoring system configured to monitor a plant, the plant monitoring system comprising:
a plurality of distributed recording units in which programs for transmitting at least a portion of a group of a pieces of state monitoring information of the plant to a predetermined information processing device are recorded, the programs being the same as each other;
a determination unit configured to sequentially acquire the pieces of state monitoring information and determine whether or not the acquired pieces of state monitoring information satisfy a program execution condition prescribed in advance; and
an execution request output unit configured to output a program execution request corresponding to the program execution condition to the distributed recording units in a case where the program execution condition is satisfied,
wherein each of the distributed recording units includes a program execution processing unit configured to read and execute the program designated by the execution request in a case where the execution request is output.

2. The plant monitoring system according to claim 1, wherein each of the distributed recording units further includes a database in which various pieces of information including the program are recorded for each block and the blocks are recorded by being continuously connected in a chain shape on the basis of hash values.

3. A plant operation assistance system configured to perform operation assistance of a plant, the plant operation assistance system comprising:
- a plurality of distributed recording units in which programs for outputting operation assistance information on the plant are recorded, the programs being the same as each other; and
- an execution request output unit configured to output an execution request to the distributed recording units in a case where the program execution request is received, wherein each of the distributed recording units includes
- an agreement determination processing unit configured to determine whether or not a predetermined agreement condition determined between a provider of the program and the agreement determination processing unit is satisfied with regard to execution of the program designated by the execution request,
- a program execution processing unit configured to execute the designated program in a case where the agreement condition is satisfied, and
- an execution history recording processing unit configured to record a pieces of execution history information indicating that the program has been executed in a case where the program is executed in response to the execution request.

4. The plant operation assistance system according to claim 3, wherein the program execution processing unit is configured to execute each of the same plurality of programs recorded in the plurality of distributed recording units, compare arithmetic values obtained by executing the programs with each other, and determine whether to output the arithmetic values or not in accordance with a comparison result.

5. The plant operation assistance system according to claim 3, wherein
- the distributed recording unit includes an approving unit configured to output an approval result of the received execution request to each of the plurality of distributed recording units, and
- the agreement determination unit is configured to determine whether or not a predetermined agreement condition is satisfied on the basis of the approval result output by each of the approving unit of the plurality of distributed recording units.

6. The plant operation assistance system according to claim 3, wherein currency substitution information increasing and decreasing depending on execution of the program is recorded in the distributed recording unit.

7. The plant operation assistance system according to claim 6, wherein the agreement determination unit is configured to determine whether or not the predetermined agreement condition is satisfied on the basis of the number of outputs indicating approval which is included in the approval result output by each of the approving units of the plurality of distributed recording units.

8. The plant operation assistance system according to claim 3, wherein the predetermined agreement condition includes a condition regarding whether or not predetermined information is shared at or after a time which is a fixed period before a time when the execution request is executed.

9. The plant operation assistance system according to claim 3, wherein
- the program recorded in the distributed recording unit is encrypted, and
- the plant operation assistance system further comprises an encryption key output unit configured to output a key for decrypting a code to the distributed recording units from the provider of the program when the agreement condition is satisfied.

10. A plant monitoring method of monitoring a plant, the plant monitoring method comprising:
- a step of recording programs for transmitting at least a portion of a group of a pieces of state monitoring information of the plant to a predetermined information processing device in a plurality of distributed recording units, the programs being the same as each other;
- a step of sequentially acquiring the pieces of state monitoring information and determining whether or not the acquired pieces of state monitoring information satisfy a program execution condition prescribed in advance;
- a step of outputting a program execution request corresponding to the program execution condition to the distributed recording units in a case where the program execution condition is satisfied; and
- a step of causing each of the storage devices to read and execute the program designated by the execution request in a case where the execution request is output.

11. A non-transitory computer-readable medium that stores a program causing a computer of a plant monitoring system configured to monitor a plant to execute:
- a step of recording programs for transmitting at least a portion of a group of a pieces of state monitoring information of the plant to a predetermined information processing device in a plurality of distributed recording units, the programs being the same as each other;
- a step of sequentially acquiring the pieces of state monitoring information and determining whether or not the acquired pieces of state monitoring information satisfy a program execution condition prescribed in advance;
- a step of outputting a program execution request corresponding to the program execution condition to the distributed recording units in a case where the program execution condition is satisfied; and
- a step of causing each of the distributed recording units to read and execute the program designated by the execution request in a case where the execution request is output.

* * * * *